(12) United States Patent
Mangal

(10) Patent No.: US 7,089,011 B1
(45) Date of Patent: Aug. 8, 2006

(54) METHOD AND SYSTEM FOR SELECTIVE CALL ROUTING FOR TRANSCODER FREE OPERATION

(75) Inventor: Manish Mangal, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 144 days.

(21) Appl. No.: 10/842,881

(22) Filed: May 11, 2004

(51) Int. Cl.
*A04Q 7/22* (2006.01)

(52) U.S. Cl. ..................................... 455/445
(58) Field of Classification Search ............... None
See application file for complete search history.

(56) References Cited

U.S. PATENT DOCUMENTS

| | | | |
|---|---|---|---|
| 5,608,779 A * | 3/1997 | Lev et al. ............... | 455/436 |
| 5,768,308 A | 6/1998 | Pon et al. | |
| 5,793,810 A | 8/1998 | Han et al. | |
| 5,956,673 A | 9/1999 | Weaver et al. | |
| 5,987,327 A * | 11/1999 | Lev et al. ............... | 455/445 |
| 5,995,923 A | 11/1999 | Mermelstein et al. | |
| 6,070,089 A | 5/2000 | Brophy et al. | |
| 6,091,969 A | 7/2000 | Brophy et al. | |
| 6,138,022 A | 10/2000 | Strawcyynski et al. | |
| 6,172,974 B1 | 1/2001 | Tseng et al. | |
| 6,185,424 B1 | 2/2001 | Pon et al. | |
| 6,215,996 B1 | 4/2001 | Fujita | |
| 6,256,612 B1 | 7/2001 | Vo et al. | |
| 6,272,358 B1 | 8/2001 | Brent et al. | |
| 6,292,662 B1 | 9/2001 | Ziv et al. | |
| 2002/0191693 A1 | 12/2002 | Nakagaki | |
| 2003/0012221 A1 | 1/2003 | El-Maleh et al. | |
| 2003/0125960 A1 | 7/2003 | Chu et al. | |
| 2003/0135376 A1 | 7/2003 | Harada | |
| 2004/0009787 A1 | 1/2004 | Oh | |

FOREIGN PATENT DOCUMENTS

| | | |
|---|---|---|
| WO | WO 96/19907 | 6/1996 |
| WO | WO 2004/008652 | 1/2004 |
| WO | WO 2004/008679 | 1/2004 |
| WO | PCT/US03/21308 | 5/2004 |

OTHER PUBLICATIONS

3rd Generation Partnership Project, "Transcoder Free Operation," 3GPPTR 25.953, V4.0.0 (Mar. 2001).

3rd Generation Partnership Project, "Out of band Transcoder control," 3GPP TS 23.153, V5.6.0 (Sep. 2003).

* cited by examiner

*Primary Examiner*—Creighton Smith

(57) ABSTRACT

An MSC receives a request from a mobile station to originate a call to a directory number that corresponds to another mobile station. The MSC sends a query that includes the directory number to an off-board translation center (OTC). The OTC determines from the directory number whether the call can be transcoder-free and, if so, provides a response with a transcoder-free indication. If the response includes a transcoder-free indication, the MSC selects a transcoder-free communication path for the call.

24 Claims, 2 Drawing Sheets

METHOD AND SYSTEM FOR SELECTIVE CALL ROUTING FOR TRANSCODER FREE OPERATION

BACKGROUND

1. Field of the Invention

The present invention relates to wireless telecommunications and, more particularly, to methods and systems for selective call routing for transcoder free operation.

2. Description of Related Art

Mobile stations often transmit and receive voice and other media in a compressed digital format in order to reduce bandwidth. In particular, a mobile station may receive voice or other media from the user, digitize it, compress the digital signals in accordance with various algorithms, and then transmit the voice or other media in the compressed digital format. A mobile station that receives media in the compressed digital format decodes it in order to obtain the original signal. Mobile stations typically include vocoders to convert the voice or other media between analog and compressed digital formats. A number of different compressed digital formats are commonly used. One example is the Enhanced Variable Rate Codec (EVRC) format, which supports voice transmission at a data rate of about 8 kilobits per second (Kbps). The EVRC format is described in the standard "Enhanced Variable Rated Codec, Speech Service Option 3 for Wideband Spread Spectrum Digital Systems," TIA/EIA/IS-127 (published January 1997), which is incorporated herein by reference.

In contrast, circuit-switched telephone networks, such as the public switched telephone network (PSTN), typically carry voice or media in an uncompressed digital format, such as a pulse code modulation (PCM) format. For example, in a typical PCM format, a voice signal is sampled at a rate of 8000 times a second and digitized with an 8-bit resolution, resulting in a 64 Kbps signal. Trunks used in the PSTN are often able to carry many of these 64 Kbps signals at a time, in separate channels. For example, a T-1 trunk is able to carry 24 of these 64 Kbps channels.

Because of the differences between these digital formats, wireless telecommunications systems often use transcoders to convert between the compressed digital formats used by mobile stations and the PCM format used by circuit-switched telephone networks. Using transcoders can result in inefficiencies, however. For example, if a call involves two mobile stations, then the voice or other media exchanged in the call may be transcoded twice. One transcoder may convert the media from the transmitting mobile station to PCM format for transmission through the PSTN, and another transcoder may convert the media from the PCM format to the compressed media format for transmission to the receiving mobile station. Using transcoders "in tandem" in this way is often undesirable because each transcoder can add delay to the transmission and can degrade the quality of the voice or other media.

To address these concerns, various proposals have been made to provide "transcoder free operation" (TrFO) in calls between mobile stations. In a transcoder-free call, no transcoders are present in the communication path. Thus, the two mobile stations exchange media during the call using a common compressed digital format, without transcoding. One such approach is described in 3$^{rd}$ Generation Partnership Project, "Out of band transcoder control," 3GPP TS 23.153 v5.6.0 (September 2003), which is incorporated herein by reference. In this approach, the media, in the common compressed digit format, is transported through a packet-switched network between media gateways that are controlled by media gateway controllers. Before a call between two mobile stations is established, the media gateway controllers use out-of-band signaling to select a common compressed digital format, i.e., to negotiate a codec that both mobile stations will use for the call. During the call, the mobile stations exchange media, using the common compressed digital format, via the media gateways and the packet-switched network.

One difficulty with this TrFO approach, however, is that it requires "next generation" network elements, such as media gateways and media gateway controllers that may not be present in "legacy," e.g., IS-41 based, wireless networks. Many wireless service providers are in the process of upgrading their networks to include such next generation network elements to allow for TrFO functionality. However, this upgrade process is likely to occur in a piecemeal fashion over the course of many years, with different service areas being upgraded at different times. As a result, "next generation" and "legacy" network elements are likely to co-exist for quite some time. This means that a mobile station could be served by either a legacy MSC or a next-generation MSC, i.e., one with access to a media gateway, depending on the wireless service provider and/or on where the mobile station is operating. Accordingly, there is a need to provide transcoder free operation in wireless networks that include both legacy and next-generation network elements.

SUMMARY

In a first principal aspect, exemplary embodiments of the present invention provide a method for selective call routing. In accordance with the method, a switching system, connected to a circuit-switched network, receives a request to originate a call from a first mobile station to a directory number corresponding to a second mobile station. The switching system sends a query that includes the directory number to a directory number translation system. The switching system receives a response from the directory number translation system. If the response includes a transcoder-free indication, the switching system forwards the call to a gateway that is connected to a packet-switched network.

In a second principal aspect, exemplary embodiments of the present invention provide a method of selective call routing. In accordance with the method, a call connection system sends a query to an information center, wherein the query includes a dialed directory number for a call. The call connection system receives a response from the information center. If the response includes a transcoder-free indication, the call connection system selects a first communication path for the call. If the response includes a transcoder-free indication, the call connection system selects a second communication path for the call.

In a third principal aspect, exemplary embodiments of the present invention provide a system for selective call routing. The system comprises: (1) a call connection system for connecting calls to and from at least one mobile station; and (2) an information center communicatively coupled to the call connection system. The information center determines whether a call from the at least one mobile station to a dialed directory number can be transcoder-free.

DETAILED DESCRIPTION OF EXEMPLARY EMBODIMENTS

The present invention, in exemplary embodiments, provides for transcoder free operation in wireless networks that include both legacy and next-generation network elements. In particular, in exemplary embodiments, a mobile station that is served by a legacy MSC may still be able to establish a transcoder-free call with another mobile station. To achieve this functionality, the wireless network may include an off-board translation center (OTC) that can provide instructions to one or more legacy MSCs regarding whether a given call can be transcoder-free and, if so, how to route the call so that it will be transcoder-free.

For example, a legacy MSC may receive a request from a first mobile station in its service area to originate a call to a second mobile station that is in a different service area. To determine how to route the call, the legacy MSC may send a query that includes the dialed directory number to the OTC. The OTC may identify the second mobile station from the dialed directory number and may determine where the second mobile station is operating. In this way, the OTC may obtaining a routing address, e.g., an MSCID or other identifier of the MSC or media gateway currently serving the second mobile station, with which the legacy MSC can use to route the call to the second mobile station. Moreover, the OTC may determine, based at least in part on where the second mobile station is operating, whether the call can be transcoder-free. If the OTC determines that the call is a transcoder-free candidate, then the OTC may provide the legacy with a transcoder-free indication. In response to the transcoder-free indication, the legacy MSC may route the call in such a way that it can be transcoder-free.

Thus, if the second mobile station is operating in an area served by another legacy MSC, then the OTC may respond with a routing address of the second MSC, without a transcoder-free indication. In response, the first MSC may route the call to the second MSC, via the PSTN, with the result that the media exchanged during the call may be transcoded; indeed, the media may be transcoded in tandem. If, however, the second mobile station is operating in an area served by a terminating media gateway, then the OTC may provide a transcoder-free indication along with a routing address for the terminating media gateway. In response to the transcoder-free indication, the MSC may forward the call to an originating media gateway, which, in turn, can transmit media to the terminating media gateway, via a packet-switched network, without transcoding. In this way, the call can be established as transcoder-free.

In addition to being used by legacy MSCs, as described above, the OTC could also be used by media gateways and/or media gateway controllers to determine whether a given call can be transcoder-free and, if so, how the call should be routed so that it is transcoder-free.

1. Exemplary Architecture

Figure 1:
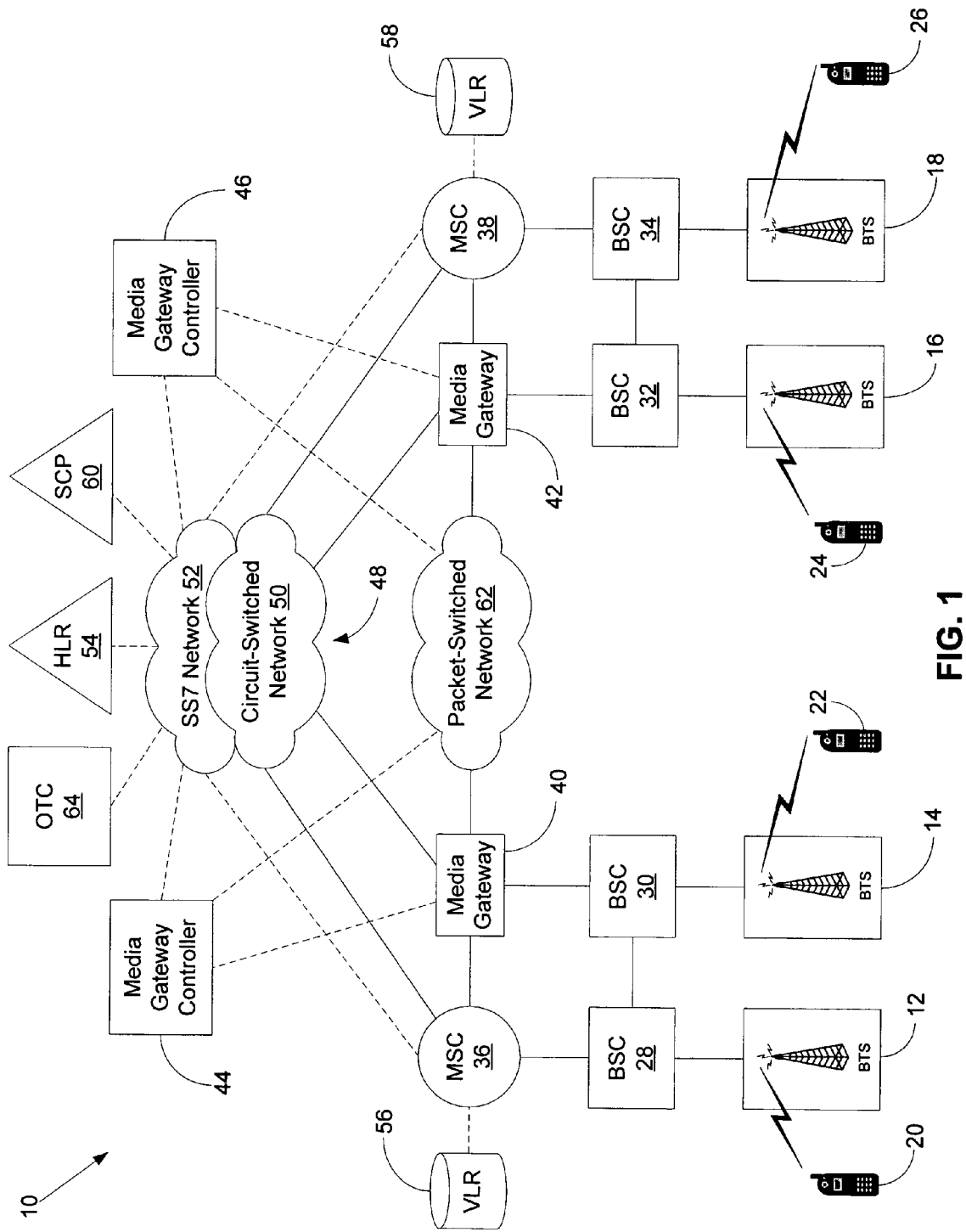
FIG. 1 is a block diagram of a wireless telecommunications system, in accordance with an exemplary embodiment of the present invention.

Referring to the drawings, FIG. 1 is a simplified block diagram of an exemplary wireless telecommunications system 10 in which exemplary embodiments of the present invention may be employed. In FIG. 1, connections that carry primarily bearer traffic, e.g., voice and/or data, are indicated by solid lines and connections that carry primarily signaling traffic are indicated by dashed lines.

Wireless telecommunications system 10 includes a plurality of base transceiver stations (BTSs) 12, 14, 16, and 18 that each provide a wireless coverage area within which the BTS may communication with one or more mobile stations over an air interface. FIG. 1 shows an exemplary configuration in which BTS 12 is in communication with a mobile station 20, BTS 14 is in communication with a mobile station 22, BTS 16 is in communication with a mobile station 24, and BTS 18 is in communication with a mobile station 26. Mobile stations 20, 22, 24, and 26 may be wireless telephones, wireless personal digital assistants (PDAs), wirelessly equipped laptop computers, or other devices that are able to transmit and receive voice or other media over an air interface. It is to be understood that the configuration shown in FIG. 1 is exemplary only, in that BTSs 12, 14, 16, and 18 could be in communication with a greater or fewer number of mobile stations. In addition, mobile stations 20, 22, 24, and 26 may be able to roam into other areas and communication with other BTSs. Thus, mobile station 20 may, at one point in time, communicate with BTS 12, as shown in FIG. 1, but mobile station 20 may move to another location and begin communicating with another BTS, such as BTS 16, at another point in time.

The wireless communications between BTSs 12, 14, 16, and 18 and mobile stations 20, 22, 24, and 26 may conform to various air interface formats, which may include digital formats, such as CDMA, TDMA, and/or GSM, and/or analog formats, such as AMPS. Preferably, CDMA is used. Applicable CDMA formats are described, for example, in TIA/EIA/IS-95-B (published Oct. 31, 1998) and in the TIA/EIA/IS-2000 Series, Rev. A-2 (published April 2002), which are incorporated herein by reference.

BTSs 12, 14, 16, and 18 may be controlled by base station controllers (BSCs) 28, 30, 32, and 34, respectively. Although FIG. 1 shows each BSC connected to only one BTS, in general, each BSC may be connected to a plurality of BTSs. BSCs 28, 30, 32, and 34 may, in turn, be connected to various types of call connection systems. Such call connections may include "legacy" systems, such as mobile switching centers (MSCs), and/or "next generation" systems, such as media gateways. In the example shown in FIG. 1, BSCs 28 and 34 are connected to MSCs 36 and 38, respectively, and BSCs 30 and 32 are connected to media gateways 40 and 42, respectively. Media gateways 40 and 42 are controlled by media gateway controllers 44 and 46, respectively. Although FIG. 1 shows the MSCs and media gateways connected to only one BSC each, in general, an MSC may be connected to a plurality of BSCs and a media gateway may be connected to a plurality of BSCs. In addition, although FIG. 1 shows media gateway controller controlling only one media gateway each, in general, a media gateway controller could control a plurality of media gateways.

In an exemplary embodiment, BSCs 28 and 34 are each connected to MSCs 36 and 38, respectively, via an A1 interface, which carries signaling traffic, and an A2 interface, which carries bearer traffic. Similarly, BSCs 30 and 32 may each be connected to media gateways 40 and 42 via A1 and A2 interfaces, however, these may be packet-based interfaces. The BSCs may also be interconnected by A3/A7 interfaces that allow calls to be forwarded from one BSC to another. For example, BSC 28 may be interconnected to BSC 30 and BSC 32 may be interconnected to BSC 34, as shown in FIG. 1.

MSCs 36 and 38 are connected to public switched telephone network (PSTN) 48 and function to connect calls to and from mobile stations operating in their respective service areas via PSTN 48. PSTN 48 includes a circuit-switched network 50 and a signaling network 52. Circuit-switched network 50 includes a plurality of circuit-switched connections that carry bearer traffic, e.g., trunks that carry voice in a pulse code modulation (PCM) format. Signaling network 52 includes a plurality of signal transfer points (STPs) that carry out-of-band signaling, such as SS7 signaling, to route calls through circuit-switched network 50.

MSCs 36 and 38 may use SS7 signaling to send and receive calls via PSTN 48. MSCs 36 and 38 may also use other types of signaling. For example, MSCs 36 and 38 may use IS-41 signaling to signal to each other, to other MSCs, to home location registers (HLRs), such as HLR 54, and to visitor location registers (VLRs), such as VLR 56 and 58. A recent revision of the IS-41 specifications, ANSI/TIA/EIA-41-D-97, published in December 1997, is incorporated herein by reference. MSCs 36 and 38 may also use WIN signaling to signal to other network elements, such as service control point (SCP) 60. Such WIN signaling may conform to the specification "Wireless Intelligent Network," TIA/ELA/IS-771, published in July 1999, which is incorporated herein by reference. In many cases, the IS-41 and WIN signaling may be carried by SS7 signaling through SS7 network 52.

HLR 54 keeps track of mobile stations that subscribe to a particular wireless service provider. Thus, in the case that the mobile stations shown in FIG. 1 all subscribe to the wireless service provider corresponding to HLR 54, then HLR 54 may store indications that mobile stations 20, 22, 24, and 26 are currently being served by MSC 36, media gateway 40, media gateway 42, and MSC 38, respectively. VLRs 56 and 58 keep track of mobile stations being served by MSCs 36 and 38, respectively. Although FIG. 1 shows VLRs 56 and 58 as being separate from MSCs 36 and 38, VLRs 56 and 58 could instead be integrated with MSCs 36 and 38.

By using appropriate SS7, IS-41, WIN, and/or other signaling, MSCs 36 and 38 may connect incoming calls from PSTN 48 to mobile stations operating in their respective service areas. Such calls may originate from landline telephones, mobile stations, or other communication devices. Similarly, MSCs 36 and 38 may connect calls originating from mobile stations operating in their respective service areas to destinations, via PSTN 48. Such destinations may include landline telephones, mobile stations, or other communication devices.

As noted above, mobile stations, such as mobile stations 20 and 26, may transmit and receive media in a compressed digital format, such as the Enhanced Variable Rate Coder (EVRC) format or the Selectable Mode Vocoder (SMV) format, whereas circuit-switched network 50 carries media in an uncompressed digital format, such as PCM. To convert between the compressed and uncompressed digital formats, BSCs 28 and 34 may include transcoders. As a result, calls between mobile stations that are routed through PSTN 48 may be transcoded twice, i.e., in tandem. For example, a call between mobile stations 20 and 26 carried by PSTN 48 might be transcoded by BSC 28, to convert between the compressed digital format used by mobile station 20 and the PCM format used by circuit-switched network 50, and by BSC 34, to convert between the compressed digital format used by mobile station 26 and the PCM format used by circuit-switched network 50. However, such transcoding can degrade quality. As described in more detail below, the present invention facilitates call routing to avoid such transcoding.

Media gateways 40 and 42, in conjunction with media gateway controllers 44 and 46, may function as "soft" MSCs that emulate many of the functions of "legacy" MSCs, such as MSCs 36 and 38. Thus, media gateways 40 and 42, in conjunction with media gateway controllers 44 and 46, may connect calls to and from mobile stations operating in their respective service areas, via PSTN 48. Media exchanged in such calls may be transcoded, as when MSCs 36 and 38 connect calls to or from mobile stations via PSTN 48. However, in an exemplary embodiment, the appropriate transcoders may be in media gateways 40 and 42, rather than in BSCs 30 and 32. In fact, BSCs 30 and 32 might not include any transcoders.

Media gateways 40 and 42 may also be connected to MSCs 36 and 38, respectively. These connections could be dedicated connections, such as inter-machine trunks (IMTs). Alternatively, the connections could be made through PSTN 48. As a result of these connections, these network elements can forward calls to one another. For example, MSC 36 could forward calls to media gateway 40 and vice-versa.

Media gateways 40 and 42 may also be connected to a packet-switched network 62. Thus, media gateways 40 and 42 may connect incoming calls from packet-switched network 62 to mobile stations operating in their respective service areas. Such calls may originate from landline telephones, mobile stations, or other communication devices. Similarly, media gateways 40 and 42 may connect calls originating from mobile stations operating in their respective service areas to destinations, via packet-switched network 62. Such destinations may include landline telephones, mobile stations, or other communication devices.

Packet-switched network 62, which may include one or more local area networks (LANs) and/or one or more wide area networks (WANs), such as the Internet, routes packets based on network addresses, such as by using the Internet Protocol (IP) protocol in combination with the User Datagram Protocol (UDP) or Transmission Control Protocol (TCP). The IP packets may be carried over lower level protocols, such as asynchronous transfer mode (ATM) protocols. Voice or other media may be carried in packet-switched network 14 in a real-time packet media format, e.g., by using the real-time transport protocol (RTP). Relevant aspects of RTP are described in Schulzrinne, et al., "RTP: A Transport Protocol for Real-Time Applications," Request for Comments 1889 (January 1996), which is incorporated herein by reference. Higher-level protocols, such as the Session Initiation Protocol (SIP) may be used to set up communication sessions, e.g., calls in which RTP is used to exchange voice or other media, through packet-switched network 62. Relevant aspects of SIP are described in Rosenberg, et al., "SIP: Session Initiation Protocol," Request for Comments 3261 (June 2002), which is incorporated herein by reference.

One advantage of having calls carried over packet-switched network 62 is that packet-switched network 62 may carry media in the compressed digital format used by mobile stations. Thus, calls carried by packet-switched network 62 can be transcoder free. For example, in a call between mobile stations 22 and 24 that is routed through packet-switched network 62, BSCs 30 and 32, and media gateways 40 and 42, may not perform any transcoding. As a result, the call can be transcoder free, with the media exchanged between mobile stations 22 and 24 carried in a common compressed digital format over the entire communication path.

In accordance with an exemplary embodiment of the present invention, wireless network 10 also includes an off-board translation center (OTC) 64. As described in more detail below, OTC 64 is a type of information center that network elements, e.g., MSCs 36 and 38 and media gateway controllers 44 and 46, can query to obtain information that can be used to route calls. For example, OTC 64 may function as a directory number translation center. As a directory number translation center, OTC 64 may receive a query containing a destination directory number from a call connection system, such as an MSC or media gateway, and may respond with a routing address, such as a point code, MSCID, and/or IP address, that the call connection system can use to route the call to the destination directory number. In addition, if the destination directory number corresponds to a mobile station, OTC 64 may respond with an indication regarding whether the call can be established as a transcoder-free call, and a routing address that can be used to route the call so that is transcoder-free. To obtain this information, OTC 64 may query other network elements, such as HLR 54 and/or SCP 60. In this way, OTC 64 can control call routing so as to facilitate the establishment of transcoder-free calls.

In an exemplary embodiment, OTC 64 may be connected to SS7 network 52 and may communicate using the WIN protocol. Alternatively or additionally, OTC 64 may communicate using other protocols and may be connected to other networks, such as packet-switched network 62. In addition, although OTC 64 is shown in FIG. 1 as being separate from HLR 54 and SCP 60, OTC 64 could instead be integrated with HLR 54 or SCP 60.

2. Exemplary Operation

In exemplary embodiments, OTC 64 provides call routing information to call connection systems so that calls that can be established as transcoder-free calls are routed so that they are established as transcoder-free calls. In an exemplary approach, OTC 64 provides this call routing information in response to queries from call connection systems upon call origination. The case of MSC 36 originating a call from mobile station 20 to another mobile station is exemplary. The flow chart of FIG. 2 illustrates this exemplary process.

Figure 2:
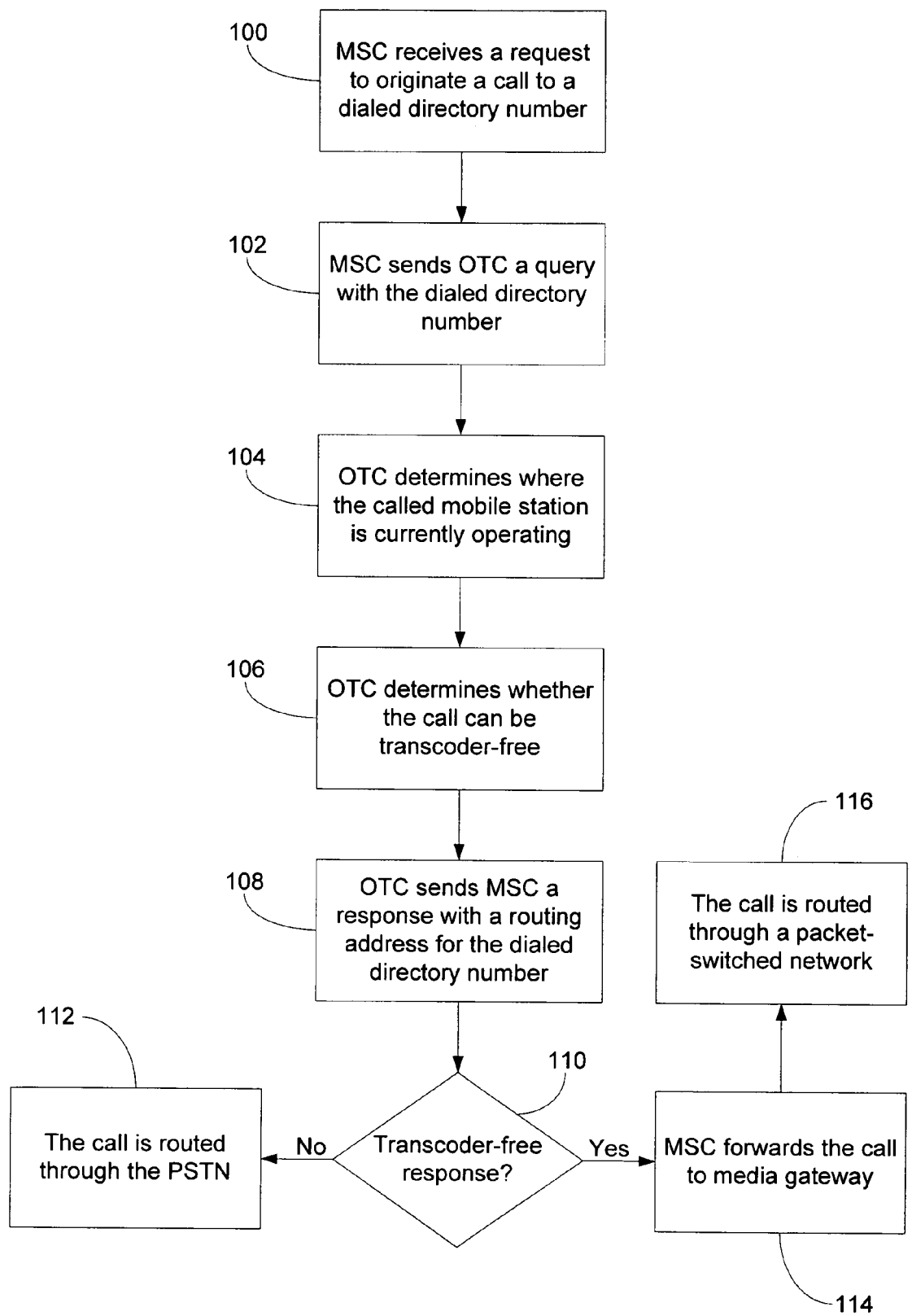
FIG. 2 is a flow chart of an exemplary call origination process, in accordance with an exemplary embodiment of the present invention.

With reference to FIG. 2, the process may begin when MSC 36 receives a request from mobile station 20 to originate a call to a dialed directory number, as indicated by block 100. In this example, the dialed directory number corresponds to another mobile station, such as mobile station 24 or 26. MSC 36 then sends OTC 64 a query that includes the dialed directory number, as indicated by block 102. In an exemplary embodiment, MSC 36 uses WIN signaling via SS7 network 52 for this query.

When OTC 64 receives the query, OTC 64 determines from the dialed directory number that the destination is another mobile station. OTC 64 then determines where the called mobile station is currently operating, as indicated by block 104. Thus, with reference to FIG. 1, if mobile station 24 is being called, OTC 64 would determine that the called mobile station is being served by media gateway 42, whereas, if mobile station 26 is being called, OTC 64 would determine that the called mobile station is being served by MSC 38. To make this determination, OTC 64 may query the HLR of the called mobile station, e.g., HLR 54. Alternatively or additionally, OTC 64 may query other network elements, such as SCP 60 or media gateway controller 46, to determine where the called mobile station is currently operating.

Once OTC 64 determines where the called mobile station is operating, OTC 64 determines whether the call can be a transcoder-free call, as indicated by block 106. This determination may be based, in part, on where the called mobile station is operating. In particular, if the called mobile station is being served by a media gateway, e.g., mobile station 24 being served by media gateway 42, then OTC 64 may determine that the call is a transcoder-free candidate. However, if the called mobile station is being served by a legacy MSC, e.g., mobile station 26 being served by MSC 38, then OTC 64 may determine that the call is not a transcoder-free candidate.

It is to be understood, however, that the fact that the called mobile station is being served by a media gateway does not mean that OTC 64 would necessarily determine that the call is a transcoder-free candidate. For example, if mobile station 24 is being called but media gateway 42 serving it is operated by a different wireless service provider, then OTC 64 may not necessarily designate the call as transcoder-free. For example, media gateway 42 may not be able to support this type of call or an appropriate business arrangement with the other wireless service provider may be lacking. It is also to be understood that OTC 64 may designate a call as a transcoder-free candidate even if the called mobile station is being served by a legacy MSC, e.g., mobile station 26 being served by MSC 38. For example, even though mobile station 26 is being served by MSC 38, the call could reach BTS 18 via media gateway 42, BSC 32, and BSC 34, thereby bypassing MSC 38. OTC 64 may also take other considerations into account in determining whether the call is a transcoder-free candidate. For example, OTC 64 may take the capabilities of the calling and called mobile stations into account, e.g., whether they can use the same compressed digital format.

After making these determinations, OTC 64 responds to the query from MSC 36, as indicated by block 108. The response may include a routing address that can be used to route the call to the terminating call connection system, i.e., the call connection system currently serving the called mobile station. The routing address could be, for example, a point code, an MSCID, or IP address associated with the terminating call connection system.

If OTC 64 has determined that the call is a transcoder-free candidate, then the response may also include a transcoder-free indication. The transcoder-free indication could be any indication in the response that MSC 36 could use to determine that the call should be routed as a transcoder-free call. Thus, the transcoder-free indication could be a predetermined flag or a code in the response. Alternatively, the routing address could itself serve as the transcoder-free indication. For example, MSC 36 could treat the use of an IP address as the routing address as a transcoder-free indication. In still another approach, the transcoder-free indication could be provided as another routing address or routing instruction that tells MSC 36 how to route the call so that it is transcoder-free. For example, the transcoder-free indication could identify a specific media gateway, e.g., media gateway 40, to which MSC 36 can forward the call so that it will be routed through a transcoder-free communication path.

MSC 38 receives the response from OTC 64 and routes accordingly. In particular, how MSC 38 routes the call may depend on whether the response from OTC 64 includes a transcoder-free indication, as indicated by block 110. If the response does not include a transcoder-free indication, then MSC 38 may send the call to the routing address, via PSTN 48, as indicated by block 112. As a result, the media exchanged in the call may be transcoded. For example, if mobile station 26 is being called, then both BSC 28 and BSC 34 may transcode the media exchanged during the call.

If, however, the response includes a transcoder-free indication, then MSC 38 may forward the call to media gateway 40, e.g., by using SS7 signaling to media gateway controller 44, as indicated by block 114. This SS7 signaling may also include the routing address of the terminating call connection system that MSC 36 obtained from OTC 64. MSC 36 may also instruct BSC 28 to forward the call to BSC 30, e.g., using the A3/A7 interface between them.

Media gateway 44 then controls media gateway 40 to route the call through packet-switched network, as indicated by block 116. For example, if mobile station 24 is being called, and the routing address corresponds to media gateway 42, then media gateway controller 44 may signal to media gateway controller 46, e.g., using SIP, to establish an RTP session through packet-switched network 62 between media gateways 40 and 42. Media gateway controllers 44 and 46 may also negotiate a common compressed digital format for mobile stations 20 and 24 to use. In this way, a transcoder-free communication path can be established between mobile stations 20 and 24, via BSC 28, BSC 30, media gateway 40, packet-switched network 62, media gateway 42, and BSC 32, so that the media exchanged during the call is not transcoded.

It is to be understood that even if OTC 64 determines that a call is a transcoder-free candidate, and MSC 36 routes the call so that it can be established as transcoder-free in response to a transcoder-free indication from OTC 64, the call may not necessarily be established as transcoder-free. In particular, the attempt to establish the desired transcoder-free communication could fail for any number of reasons, e.g., due to hardware or software incompatibility or to high traffic loads. In such cases, a different communication path, which may not be transcoder-free, might be established in a fall-back attempt.

Although in the example shown in FIG. 2 and described above, a legacy MSC sends the query to OTC 64, in some embodiments "next generation" network elements may also be able to query OTC 64 to determine whether calls can be routed so that they are transcoder-free. For example, when media gateway 40 receives a request from mobile station 22 to originate a call to another mobile station, media gateway controller 44 may send a query with the dialed directory number to OTC 64. Then, depending on the response from OTC 64, media gateway 40 and media gateway controller 44 may route the call through packet-switched network 62 (if the call is a transcoder-free candidate) or through PSTN 48 (if the call is not a transcoder-free candidate).

3. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for selective call routing, said method comprising:
    a switching system receiving a request to originate a call from a first mobile station to a directory number corresponding to a second mobile station, said switching system being connected to a circuit-switched network;
    said switching system sending a query to a directory number translation system, said query including said directory number;
    said switching system receiving a response from said directory number translation system; and
    if said response includes a transcoder-free indication, said switching system forwarding said call to a first gateway, said first gateway being connected to a packet-switched network.

2. The method of claim 1, further comprising:
    said first gateway routing said call through said packet-switched network to a second gateway, said second mobile station operating in a wireless coverage area served by said second gateway.

3. The method of claim 2, further comprising:
    alerting said second mobile station of said call; and
    said second mobile station answering said call to establish a transcoder-free communication path between said first mobile station and said second mobile station.

4. The method of claim 3, further comprising:
    said first mobile station and said second mobile station exchanging media in a compressed digital format, via said transcoder-free communication path, without said media being transcoded.

5. The method of claim 4, wherein said compressed digital format is an Enhanced Variable Rate Coder (EVRC) format.

6. The method of claim 1, wherein said switching system is a mobile switching center (MSC).

7. The method of claim 6, wherein said first mobile station is operating in a wireless coverage area provided by a base transceiver station (BTS), and said BTS is communicatively coupled to said MSC via a first base station controller (BSC).

8. The method of claim 7, wherein said first gateway is communicatively coupled to a second BSC, further comprising:
    forwarding said call from said first BSC to said second BSC.

9. The method of claim 1, further comprising:
    said directory number translation system receiving said query; and
    in response to said query, said directory number translation system determining whether said call can be transcoder-free; and
    if said call can be transcoder-free, said directory number translation system including said transcoder-free indication in said response.

10. The method of claim 9, wherein said directory number translation system determining whether said call can be transcoder-free comprises:
    said directory number translation system determining where said second mobile station is operating.

11. The method of claim 10, wherein said directory number translation system determines where said second mobile station is operating by querying a home location register (HLR).

12. The method of claim 9, further comprising:
    in response to said query, said directory number translation system determining a routing address based on said directory number; and
    said directory number translation system including said routing address in said response.

13. The method of claim 12, wherein said switching system forwarding said call to a first gateway comprises:
    said switching system forwarding said routing address to said first gateway.

14. The method of claim 1, further comprising:
    if said response does not include said transcoder-free indication, said switching system routing said call through said circuit-switched network.

15. A method for selective call routing, said method comprising:

a call connection system sending a query to an information center, said query including a dialed directory number for a call;

said call connection system receiving a response from said information center; and said call connection system selecting a first communication path for said call if said response includes a transcoder-free indication, said call connection system selecting a second communication path for said call if said response does not include said transcoder-free indication.

16. The method of claim 15, wherein said first communication path is transcoder-free and said second communication is not transcoder-free.

17. The method of claim 15, wherein said first communication path includes a packet-switched network and said second communication path includes a circuit-switched network.

18. The method of claim 15, wherein said call connection system includes a mobile switching center (MSC).

19. The method of claim 15, wherein said call connection system includes a media gateway and a media gateway controller.

20. A system for selective call routing, said system comprising:

a call connection system for connecting calls to and from at least one mobile station, wherein said call connection system includes a media gateway and a media gateway controller; and an information center communicatively coupled to said call connection system, wherein said information center determines whether a call from said at least one mobile station to a dialed directory number can be transcoder-free.

21. The system of claim 20, wherein said call connection system includes a mobile switching center (MSC).

22. The system of claim 20, wherein said call connection system sends a query to said information center with said dialed directory number in response to a request from said at least one mobile station to originate a call to said dialed directory number.

23. The system of claim 22, wherein said information center sends said call connection system a response to said query, said response including a routing address.

24. The system of claim 23, wherein said response includes a transcoder-free indication if said information center determines that said call can be transcoder-free.

* * * * *